United States Patent [19]

Inamura

[11] Patent Number: 4,853,544

[45] Date of Patent: Aug. 1, 1989

[54] HEAT-RESISTANT CASE FOR AN IONIZATION-TYPE SMOKE DETECTOR AND METHOD OF MAKING THE SAME

[76] Inventor: Katsumasa Inamura, c/o Nohmi Bosai Kogyo Kabushiki Kaisha, 7-3, Kudan Minami 4-chome, Chivoda-ku, Tokyo 102, Japan

[21] Appl. No.: 183,650

[22] Filed: Apr. 19, 1988

Related U.S. Application Data

[63] Continuation-in-part of Ser. No. 732,831, Apr. 19, 1985, abandoned.

[30] Foreign Application Priority Data

Sep. 5, 1983 [JP] Japan ............................... 58-136611

[51] Int. Cl.[4] ............................................ G01T 1/185

[52] U.S. Cl. ................................ 250/385.1; 250/381; 250/384

[58] Field of Search ............ 250/381, 382, 384, 385.1, 250/389

[56] References Cited

U.S. PATENT DOCUMENTS

| | | | |
|---|---|---|---|
| 3,560,737 | 2/1971 | Skildum | 250/385.1 |
| 3,609,435 | 9/1971 | Taylor et al. | 250/385.1 |
| 4,167,687 | 9/1974 | Furney | 250/381 |
| 4,564,762 | 1/1986 | Doherty et al. | 250/385.1 |
| 4,582,996 | 4/1986 | Scheidweiter et al. | 250/385.1 |
| 4,594,512 | 6/1986 | Sasaki | 250/385.1 |

*Primary Examiner*—Carolyn E. Fields
*Assistant Examiner*—David P. Porta
*Attorney, Agent, or Firm*—Tilton, Fallon, Lungmus & Chestnut

[57] ABSTRACT

An ionization-type smoke detector having a heat-resistant metal case forming the outer electrode and, with an attached rear cover, enclosing the upper portion of an insulating base board. The heat-resistant case includes a cylindrical portion surrounding an outer ionization chamber, a rectangular quadratic portion surrounding the insulating base board, and a planar stepped portion connecting the quadratic prism portion and the cylindrical portion. In the method of forming the case, a metal plate is first subjected to a drawing process to form a cylindrical cup-shaped recess that will ultimately become the cylindrical portion of the case. The remainder of the plate includes a rectangular central section and four integral rectangular outer sections extending along each of the four sides of the central section. The rectangular outer sections are then bent upwardly to form the rectangular quadratic prism portion, and the adjacent side edges of the four rectangular four sections are secured to each other by studs that may also be used to connect the case to its cover.

6 Claims, 3 Drawing Sheets

HEAT-RESISTANT CASE FOR AN IONIZATION-TYPE SMOKE DETECTOR AND METHOD OF MAKING THE SAME

RELATED APPLICATION

This application is a continuation-in-part of my co-pending application Ser. No. 732,831, filed Apr. 19, 1985, now abandoned.

BACKGROUND OF THE INVENTION

The present invention relates to an ionization-type smoke detector and, more particularly, to a heat-resistant case which prevents the scattering of radioactive source in an ionization-type smoke detector, and to the method of forming such a case.

An ionization-type smoke detector detects changes in ionization current due to smoke, etc., and since for this purpose it is provided with a radioactive source to ionize the air within the inner and outer ionization chambers, if the detector is destroyed by high temperatures at the time of a fire, there is the danger that the radioactive source may scatter. Therefore, the detector needs to be covered with a heat-resistant case. Since each of the electrodes of an ionization-type smoke detector are made of metal, the heat-resistant case can be economically constituted by utilizing the case as the outer electrode and by forming the rear cover as a metal plate.

Now an example of an ionization-type smoke detector of this kind will be explained in reference to FIG. 1 of the accompanying drawings where reference 1 denotes an insulating base board and below its undersurface are supported an inner electrode 4 mounted by means of a screw 3 with a radioactive source 2, an intermediate electrode 6 having a central hole 5, and also a net- or grid-like air permeable outer electrode 7 whereby inner and outer ionization chambers 8 and 9 are formed within the intermediate electrode separating both chambers. The outer electrode 7 covers the side surface of the insulating base board 1 up to its uppermost portion. The reference numeral 10 is a circuit board constituting a circuit to detect electrical changes in the outer ionization chamber 9, the electrodes 4, 6 and 7 being connected to the circuit board 10. Further, the reference number 11 is a rear cover made of a metal plate put on the rear side of the insulating base board 1 at its upper portion.

With such a construction, since the detector can be wholly covered with a heat-resistant case made of metal comprising the outer electrode 7 and the rear cover 11, even if the detector is destroyed at the time of a fire, etc. there is no danger of the radioactive source scattering. When constituting such a heat-resistant case, where the insulating base board 1 is circular the outer electrode 7 as a whole may be made in a cylindrical shape which can be easily formed by a drawing process. However, in a case where the insulating base board has a square shape, it becomes difficult to shape the outer electrode 7 entirely through a drawing process since at least the portion of the outer electrode 7 which surrounds the insulating base board 1 has to be shaped so as to have a square form.

SUMMARY OF THE INVENTION

The present invention is directed to the provision of a rigid, heat-resistant metal case for an ionization-type smoke detector which has a square shape at the portion surrounding the insulating base board of the detector, and to a highly-effective method for forming such a case.

The ionization-type smoke detector has inner, intermediate, and outer electrodes, each supported on an insulating base board. The intermediate electrode separates the inner and outer ionization chambers within the case, and the outer electrode is formed by the case itself, along with the metallic cover closing the upper portion of the insulating base board. The heat-resistant case comprises a cylindrical portion surrounding the outer ionization chamber and a rectangular quadratic prism portion surrounding the insulating base board, these portions being integrally joined by a planar stepped portion so that the periphery of the rectangular quadratic prism portion comprises planar portions bent vertically from the stepped portion. Studs may then be used to join the adjacent vertical planar portions and provide connectors for securing the cover in place.

Briefly, the method of forming a heat-resistant metal case for an ionization-type smoke detector comprises the steps of subjecting a metal plate to a drawing process to form a generally cylindrical cup-shaped recess or depression therein surrounded by the remaining portion of the plate which lies in a plane generally normal to the longitudinal axis of the cylindrical recess. The remaining portion of the plate includes a rectangular central section, which ultimately becomes the stepped portion of the case, and four integral rectangular outer sections which become the vertical side walls of the quadratic prism portion Following the drawing step, each of the rectangular outer sections is bent upwardly away from the recess along lines extending between such rectangular sections and the central section. The rectangular outer sections thereby form the sides of the rectangular quadratic prism portion Following the bending operation, the adjacent side edges of the four rectangular sections are parallel with, and in close proximity to, each other. The adjacent side edges of the rectangular sections may be joined together by affixing studs in the corners of the rectangular quadratic prism portion. Such studs may be provided with threaded apertures and, in addition to joining the rectangular outer sections together, provide the means for mounting a rectangular metal cover to the casing.

DETAILED DESCRIPTION OF PREFERRED EMBODIMENT

Figure 1:
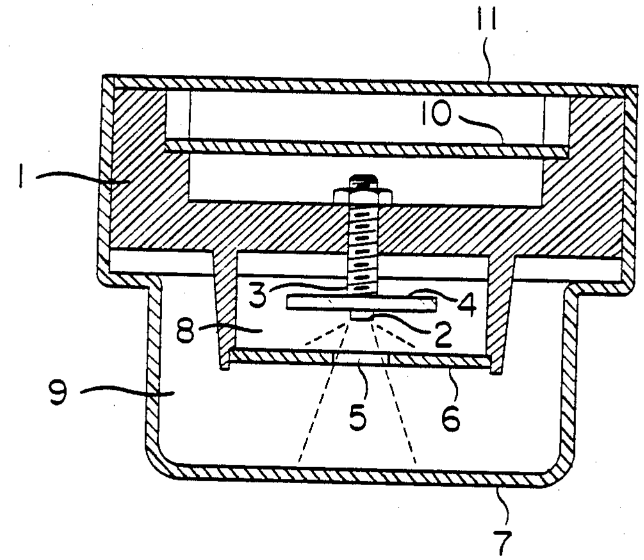
FIG. 1 PRIOR ART
FIG. 1 is a vertical sectional view of a conventional ionziation-type smoke detector covered with a heat-resistant case.
Figure 2:
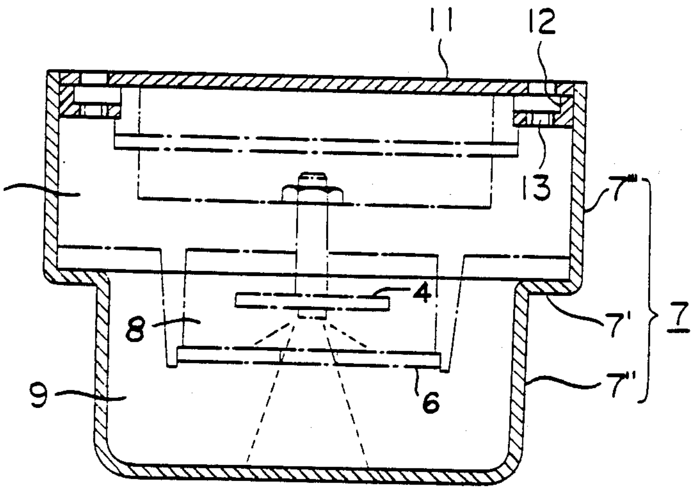
FIG. 2 is a vertical sectional view of one embodiment of the present invention.
Figure 3:
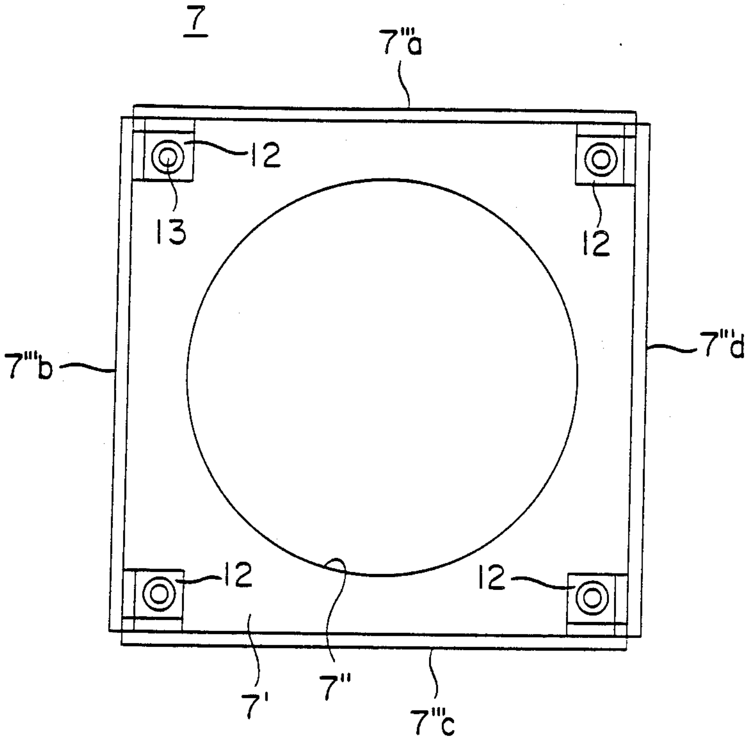
FIG. 3 is a plane view of only the outer electrode with the mounting studs in place.

As shown in the drawings, an outer electrode 7 which constitutes a heat-resistant metal case together with a rear cover 11 made of a metal plate, comprises a cylindrical portion 7″ which borders a planar stepped portion 7′ and surrounds an outer ionization chamber 9, and a rectangular quadratic prism portion 7‴ surrounding the insulating base board 1. The cylindrical portion 7″ can be shaped by a suitable process such as a drawing process, whereas the rectangular quadratic prism portion 7‴ has its periphery formed of respective vertical rectangular walls 7‴*a* to 7‴*d*, each bent from the planar stepped portion 7′. The rectangular vertical planar walls 7‴*a* to 7‴*d* that adjoin each other are joined by studs 12, respectively. Each stud 12 is provided with a screw hole 13 so that the rear cover 11 may be secured thereto by screws.

Figure 4:
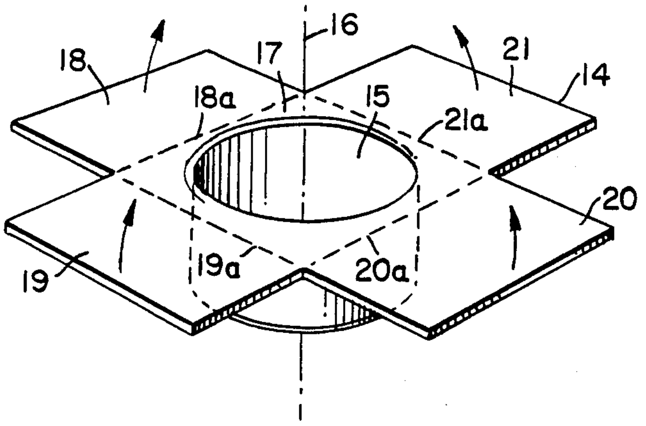
FIGS. 4–6 are perspective views illustrating the steps of forming the heat-resistant case.
Figure 5:
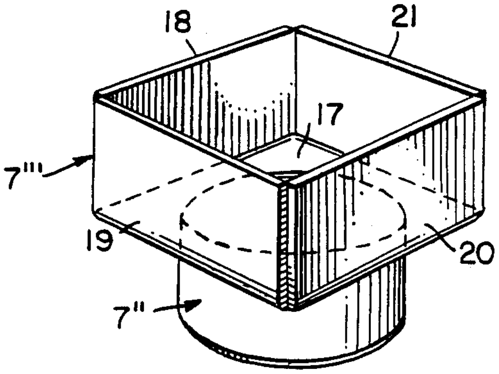
Figure 6:
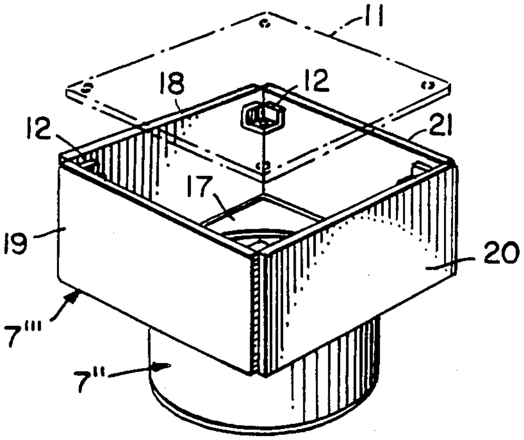

FIGS. 4–6 illustrate the method of forming the heat-resistant case. In FIG. 4, a metal plate 14 is shown to have a cylindrical cup-shaped recess 15 formed therein by a conventional drawing process. The portion of the plate surrounding the cup-shaped recess extends along a plane normal to the longitudinal axis 16 of the cylindrical recess. It will be observe that the portion of the plate surrounding the recess is composed of five integral sections, namely, a rectangular (square) central section 17 and four rectangular outer sections 18–21. Thereafter, each of the rectangular sections 18–21 is bent upwardly (i.e., in a direction away from the longitudinal direction of recess 15) about lines 18*a*, 19*a*, 20*a*, and 21*a*. When bent in directions perpendicular to the plane of central section 17, the rectangular outer sections 18–21 assume the positions shown in FIG. 5. The adjacent edges of the rectangular sections are adjacent to and parallel with each other. Studs 12 are then welded or otherwise secured to the inside corners of the quadratic prism portion 7‴ and cover 11 may then be secured to the studs by screws (not shown) or by any other suitable connecting means.

The outer electrode therefore comprises the cylindrical portion 7″ surrounding the outer ionization chamber which borders the stepped portion 7′, the rectangular quadratic prism portion 7″ surrounding the insulating base board, the periphery of the rectangular quadratic prism portion being formed by the respective vertical rectangular sections 18–21 bent from the central portion 17 (which, following the bending step, becomes the stepped portion 7′) with the respective rectangular portions 18–21 being joined to each other by the respective studs 12 so that the rectangular sections 18–21 are rigidly anchored together. Since the studs are adapted to mount the rear cover such as by screws, no special means are necessary for mounting the rear cover. A rigid, heat-resistant, integral metal case suitable for an ionization-type smoke detector which has an enlarged insulating base board of a square shape is therefore readily provided.

I claim:

1. A method of forming a heat-resistant metal case for an ionization-type smoke detector, comprising the steps of subjecting a metal plate to a drawing process to form a generally cylindrical cup-shaped recess therein surrounded by the remaining portion of said plate lying in a plane normal to the longitudinal axis of said cylindrical recess, said remaining portion of said plate including a rectangular central section containing said recess and four integral rectangular outer sections extending along each of the four sides of said rectangular central section, and bending each of said rectangular outer sections in a direction away from said recess, and along a fold line extending between each said rectangular section and said central section, to form a rectangular quadratic prism portion in which adjacent side edges of said four rectangular sections are parallel with, and in close proximity, to each other.

2. The method of claim 1 in which there is the additional step of securing said adjacent side edges of said rectangular sections together.

3. The method of claim 2 in which said step of securing said side edges includes affixing studs in the corners of said rectangular quadratic prism portion, each stud being affixed to two of said rectangular outer sections near the adjacent side edges thereof.

4. The method of claim 3 in which there is the further step of affixing a cover to said studs.

5. A heat resistant case for an ionization-type smoke detector, said case being formed of metal and comprising an outer electrode (7), and a cover plate (11); said case containing inner and outer ionization chambers (8,9), an inner electrode (4), an intermediate electrode (6), and an insulating base board (1) supporting said inner and intermediate electrodes within said outer electrode (7); wherein the improvement comprises said outer electrode having a cylindrical portion (7″), a planar stepped portion (7′) integral with said cylindrical portion and extending from one end of said cylindrical portion along a plane generally normal to the axis of said cylindrical portion, said planar stepped portion (7′) having four straight outer borders of generally rectangular outline, and a rectangular quadratic prism portion (7‴) integral with said planar stepped portion (7′) and comprising four planar extensions (7‴*a* to 7‴*d*) from said borders, each extension being bent at generally right angles with respect to said planar stepped portion (7′) and extending in a direction away from said cylindrical portion (7″), said extensions (7‴*a* to 7‴*d*) having adjacent edges meeting at the corners of said quadratic prism portion, and stud means (12) joining said adjacent edges.

6. A heat-resistant case for an ionization-type smoke detector as defined in claim 5 wherein said cover plate (11) is secured to said stud means (12).

* * * * *